June 27, 1939.  D. R. SHOULTS  2,164,181
METHOD OF AND APPARATUS FOR ACCELERATING AND
SYNCHRONIZING A SYNCHRONOUS MACHINE
Original Filed Feb. 27, 1937
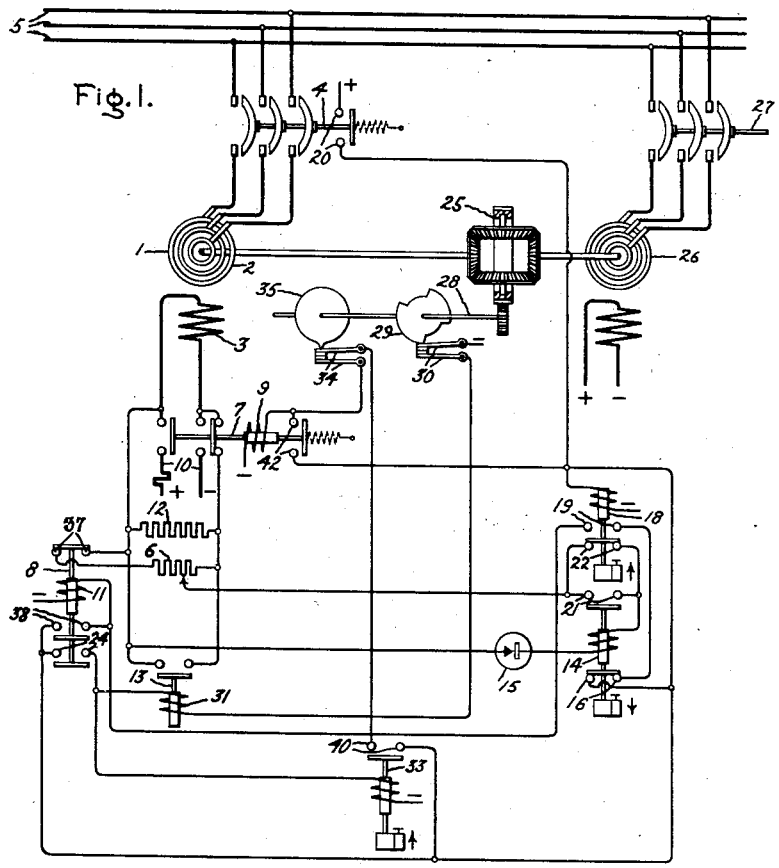
Inventor:
David R. Shoults,
by. Harry E Dunham
His Attorney.

Patented June 27, 1939

2,164,181

UNITED STATES PATENT OFFICE 2,164,181

METHOD OF AND APPARATUS FOR ACCELERATING AND SYNCHRONIZING A SYNCHRONOUS MACHINE

David R. Shoults, Schenectady, N. Y., assignor to General Electric Company, a corporation of New York Application February 27, 1937, Serial No. 128,218
Renewed January 11, 1939

24 Claims. (Cl. 171—118)

My invention relates to a method of and apparatus for accelerating and synchronizing a synchronous machine, and its object is to provide a new and improved method and apparatus for accomplishing this result.

In some cases the load on a synchronous machine during starting may be so great that it is impossible for the machine to get near enough to synchronous speed, while operating as an induction machine, to be synchronized merely by applying excitation to the field winding. In accordance with my invention, I provide an arrangement for repeatedly varying the time constant of the field circuit of a synchronous machine in such a manner, during each cycle of slip after the machine reaches a predetermined speed, as to cause the machine to accelerate to a sufficiently high subsynchronous speed so that when field excitation is applied the machine will pull in and stay in synchronism.

In my copending application Serial No. 48,503, filed November 6, 1935, and assigned to the same assignee as this application, I have disclosed and claimed an improved arrangement for controlling the time constant of the discharge circuit of a synchronous machine field winding so as to improve the synchronizing ability of the machine. In accordance with that improved arrangement, when the machine, while operating as an induction machine, reaches the desired speed from which it is to be pulled into synchronism the time constant of the field discharge circuit is decreased to a relatively low value at substantially the point in the slip cycle where the flux in the field poles is just starting to build up in a positive direction (the direction of the flux produced by the direct current excitation during synchronous operation) and then the source of excitation is connected to the field winding at that point in the slip cycle where the flux in the field poles in the positive direction is at the maximum value permitted by the relatively low time constant field discharge circuit. As pointed out in the aforesaid copending application, the connection of the source of excitation increases the time constant of the field circuit so that the increased value of flux is trapped in the field poles for a sufficient length of time to pull the motor into step. Preferably the time constant of the field circuit is decreased to such a value as to allow the maximum value of flux in the field poles to occur near the zero load angle by which, I mean the electrical angle between corresponding points on the field structure of the machine being started and on the field structure of another synchronous machine generating no load voltage equal to and in phase with the voltage applied to the machine being started. Angular displacements are measured positively as the machine is displaced from the no load angle by motor loads.

I have also found, as disclosed in my copending application, Serial No. 122,036, filed January 23, 1936, and assigned to the same assignee as this application, that the amount of load which a synchronous machine can pull into step is dependent upon the time constant of the field circuit at the instant the machine is being pulled into step and is substantially independent in machines of moderate to long field time constants— of the voltage of the direct current excitation applied at this particular time, and therefore, substantially the same load can be pulled into step by short-circuiting the field winding as by connecting a source of excitation thereto. But when the machine is synchronized by short-circuiting the field winding, it is necessary to have excitation applied before the flux in the field poles has decreased to such a low value that the motor will pull out of step.

In some cases a synchronous machine may be so heavily loaded during starting that it is impossible to get the machine to operate at a sufficiently high speed as an induction machine to permit it to be pulled into step by the synchronizing arrangements disclosed in the aforesaid applications. In such cases, I provide, in accordance with my present invention, an improved modification of the arrangements disclosed in the aforesaid copending applications in which the time constant of the field circuit is changed in cyclic relation to the slip so as to accelerate the motor to a higher speed. This improved modification preferably comprises an arrangement whereby with the machine operating at a predetermined speed as an induction machine the time constant of the field circuit is decreased to a relatively low value so that the flux in the field poles builds up very rapidly to a high maximum value at substantially the zero load angle, and then thereafter at each point in the slip cycle when the flux in the field poles is at its maximum value, the time constant of the field circuit is increased to a relatively high value so as to "trap" this maximum value of flux in the field poles and at a subsequent point within a half slip cycle the time constant of the field circuit is restored to its relatively low value. Such an arrangement results in an accelerating torque being produced during a large portion of each half-cycle of slip, and this increase in torque causes the motor to accelerate to a higher speed from which it may be satisfactorily synchronized by applying excitation to the field winding at the proper point in the slip cycle after the time constant varying means has been in operation for a sufficient time to effect the necessary increase in machine speed.

My invention will be better understood from the following description when taken in connection with the accompanying drawing, in which Fig. 1 diagrammatically illustrates a synchronous motor starting system embodying my invention; Fig. 2 of which shows explanatory curves; and Fig. 3 of which illustrates a modification of the embodiment of my invention shown in Fig. 1.

Referring to Fig. 1 of the drawing, I represents a synchronous motor which is provided with an armature winding 2 and a field winding 3. In order to simplify the disclosure, I have shown my invention in connection with a full voltage starting arrangement for a synchronous motor so that it is started by connecting the armature winding 2, by means of a suitable manually controlled switch 4, directly across an alternating current supply circuit 5 while the field winding 3 is short-circuited through a discharge resistor 6 and a parallel connected resistor 12. Therefore, normal supply circuit voltage is supplied to the winding to start the motor as an induction motor. In practice, the motor will also usually have a squirrel cage or other windings, which are not shown. While I have shown a full voltage starting equipment, it will be understood that any other well-known synchronous motor starting equipment may be employed to start the motor from rest and accelerate it to approximately synchronous speed.

The connection of the field winding 3 to the discharge resistor 6 is completed by means of a two-position field switch 7 and a two-position field discharge switch 8 when they are in the positions shown in the drawing. The switch 7 is provided with an operating winding 9 which, when energized, causes the switch 7 to move to its other position, in which it connects the field winding 3 to a suitable source of excitation 10. The switch 8 is provided with an operating winding 11 which, when energized, causes the switch 8 to move to its other position so as to disconnect the resistor 6 from in circuit with the field winding 3. The discharge resistor 6 in combination with resistor 12 is preferably designed to have such a value as to produce the best induction motor torque characteristic during the starting operation.

In order to accelerate the motor to a higher induction motor speed than can be obtained with the resistor 6 in the field discharge circuit, I provide, in accordance with my invention, an arrangement which functions, after the motor has reached a predetermined speed, to complete for the field winding 3, during a predetermined portion of each half cycle of motor slip, a circuit having a relatively low time constant and to complete therefore during the remaining portion of each half-cycle of the motor slip a circuit having a relatively high time constant. Also, I provide means for applying excitation to the field winding at a predetermined point in the slip cycle after the time constant varying means has been in operation for a sufficient length of time to effect a desired increase in the motor speed.

In the arrangement disclosed in Fig. 1, this result is accomplished by first effecting the operation of the field discharge switch 8 after the motor 1 reaches a predetermined speed so as to increase the resistance of the field discharge circuit by opening the circuit through the resistor 6. If so desired, the operation of switch 8 may completely open the field discharge circuit, but in order to prevent excessive voltages being induced in the field winding, I prefer to have a relatively high resistance 12 connected in circuit with the field winding 3 after the switch 8 operates. This resistor 12 may be constructed of any suitable material but preferably of a material having an inverse potential impedance characteristic, such, for example, as the material disclosed in United States Letters Patent 1,622,742, granted September 8, 1931, and assigned to the same assignee as this application.

The operation of the switch 8 therefore decreases the time constant of the field circuit so that the flux in the motor field poles increases to a higher maximum value at a smaller load angle. This will be more clearly seen from the curves shown in Fig. 2, in which curve A shows how the flux in the field poles varies as the load angle varies at a predetermined constant slip when a high value of resistance, such as resistor 12, is connected in the field circuit, the curve B shows how the flux in the field poles varies as the load angle varies at the same predetermined slip when the field circuit includes a lower value of resistance such as the resistor 6, and curve C shows how the flux in the field poles varies as the load angle varies at the same slip when the field winding is short-circuited. These curves clearly show that as the time constant of the field circuit is decreased the maximum value of flux in the field poles increases and this increased maximum value of flux occurs at a point in the slip cycle nearer the zero load angle.

After the switch 8 has transferred the field connections so that the motor is operating with a short time constant field circuit, the time constant of this circuit is periodically varied by means of a high speed switch 13 which, when operated, short-circuits the resistor 12.

For controlling the operation of the switch 8 so that it is operated after the motor reaches a predetermined subsynchronous speed, I provide the frequency responsive relay arrangement disclosed in United States Letters Patent 1,958,250, granted May 8, 1934, to H. T. Seeley, assignor to the same assignee as this application. As shown in the drawing, this frequency responsive relay arrangement includes a time relay 14 and a half-wave rectifier 15 connected in series across a portion of the discharge resistor 6. With such an arrangement, the induced current, which flows through the motor field winding while the motor is operating below synchronous speed with the resistor 6 in circuit with the field winding 3 causes the relay 14 to pick up and remain in its picked-up position until the motor reaches a predetermined subsynchronous speed, at which time the frequency of the induced current becomes sufficiently low to allow the relay to return to its normal position at the end of the half-cycle of induced field current which does not flow through the relay winding. The contacts 16 of the relay 14 are connected in the energizing circuit of the operating winding 11 of the switch 8 so that it cannot close until the motor speed is above a predetermined value.

In order to insure that the switch 8 is not closed until after the motor 1 has started and the relay 14 has had time to open its contacts 16, I provide a relay 18 which has its contacts 19 connected in series with the contacts 16 of relay 14 and the operating winding 11 of switch 8. The circuit of the winding of relay 18 includes the auxiliary contacts 20 of the switch 4 so that the relay 18 is energized when the switch 4 is closed. The relay 18 is designed in any suitable manner so that it does not close its contacts 19 until after the relay 18 has been energized for a predetermined time. Therefore, when the switch 4 is closed to start the motor 1, the relay 14 has time to open its contacts 16 and close its contacts 21 in shunt to the contacts 22 of relay 18 before the relay 18 closes its contacts 19 in series with the contacts 16.

In addition to opening the circuit through the resistor 6, the switch 8, by closing its contacts 24, also renders the high speed switch 13 operative. For effecting the energization and de-energization of the operating winding 31 of switch 13 during the desired portions of each slip cycle of the motor 1, I provide a differential gear mechanism 25, one gear of which is driven by the motor 1 and another gear of which is driven by an unloaded pilot synchronous motor 26 connected to the supply circuit 5 by a suitable switch 27. The differential gear mechanism 25 is arranged in any suitable manner so that it drives a shaft 28 at a speed of one revolution for each slip cycle of the motor 1 relative to the speed of the motor 26. On the shaft 28 is fastened an adjustable cam 29 which is so designed that it closes the contacts 30 during the desired portions of each revolution of the shaft 28 and consequently during the desired portions of each slip cycle of the motor 1. The contacts 30 are connected in the energizing circuit of the operating winding 31 of switch 13. Therefore, after the motor 1 reaches a predetermined speed so that the switch 8 closes its contacts 24, the cam 29 repeatedly completes the energizing circuit for the operating winding 31 during predetermined portions of each slip cycle of the motor 1. As shown, the cam 29 is designed to maintain the switch 13 closed during the load angle range of 0° to 120° and 180° to 300° but these ranges may be varied as desired.

In order to effect the operation of the field switch 7 after the switch 13 has been operated a number of times and thereby has effected the desired increase in the speed of the motor, I provide a timing device 33, shown as a time relay, which is set into operation by the relay 14 when it responds to the motor reaching a predetermined subsynchronous speed. This time relay 33, after being in operation for a predetermined time, is arranged to control the energizing circuit for the operating winding 9 of the field switch 7 so that the next time a predetermined point in the slip cycle is reached, which is indicated by the closing of the contacts 34 by another adjustable cam 35 mounted on the shaft 28, the switch 7 is closed to apply excitation to the field winding.

The operation of the arrangement shown in the drawing is as follows: When it is desired to start the motor 1, the synchronous motor 26 is placed in operation. Then the switch 4 is closed so that the full voltage of the supply circuit 5 is applied to the armature winding 2 of the motor 1 to start this motor from rest and accelerate it to a speed near synchronous speed. As soon as the motor armature winding is energized, a voltage of slip frequency is induced in the motor field winding 3, and this voltage causes a current of slip frequency to flow through the field winding 3 and the discharge resistor 6 and a pulsating current to flow through the rectifier 15 and the winding of relay 14. Until the motor reaches substantially synchronous speed, the magnitude and periodicity of the rectified current through the winding of relay 14 are such that the relay picks up and maintains its contacts 16 open. By closing its contacts 21, the relay 14 completes a shunt circuit around the contacts 22 of relay 18. The closing of the auxiliary contacts 20 of the switch 4 completes an energizing circuit for the time relay 18, but this relay does not open its contacts 22 and close its contacts 19 until after the relay 14 has operated to open its contacts 16 which are in series with contacts 19 and close its contacts 21 in shunt to contacts 22.

The relay 14 is so adjusted that when the motor reaches a predetermined subsynchronous speed, the frequency of the induced current in the field winding 3 and the resistor 6 is then low enough to allow the relay to return to its normal position at a time when the induced field current is approximately zero. The closing of the contacts 16 of relay 14 completes through contacts 20 of switch 4, and contacts 19 of relay 18 an energizing circuit for the operating winding 11 of switch 8. The opening of the contacts 37 of switch 8 disconnects the resistor 6 from the field circuit so as to decrease the time constant thereof and the closing of the contacts 38 of switch 8 completes a shunt circuit around the contacts 19 of relay 18 and the contacts 16 of relay 14 in the energizing circuit of the operating winding 11.

After the switch 8 closes its contacts 24 an energizing circuit is completed for the operating winding 31 of switch 13 by the cam 29 during predetermined portions of each half slip cycle to effect the short-circuiting of the resistor 12 in the field circuit and thereby increase the time constant thereof. The effect of the increase in the time constant of the field circuit on the flux in the field poles is shown, in Fig. 2, by the curve D which represents the flux in the field poles for a given slip frequency when the resistor 12 is short-circuited during the load angle ranges of 0° to 120° and 180° to 300°. X is the value of flux in the positive direction at the load angle of 0° at the instant when the resistor 12 is short-circuited. Y is the value of the flux in the positive direction at a load angle of 120° when the short circuit around the resistor 12 is opened. X' represents the value of flux in the negative direction at the load angle of 180° when the short circuit is again completed around the resistor 12, and Y' is the value of flux in the negative direction at a load angle of 300° when the short circuit around the resistor 12 is opened. It will be seen by comparing the curves A and B that by increasing the time constant of the field circuit each time the flux in the field poles reaches its maximum value the field flux remains substantially constant over a substantial load angle and consequently an increased accelerating torque is produced thereby.

A predetermined time after the switch 8 closes its contacts 24 the time relay 33 closes its contacts 40 so that when the predetermined load angle occurs at which it is desired to apply excitation, and which in the drawing is the zero load angle, the cam 35 closes its contacts 34 and completes a circuit for the operating winding 9 to close the field switch 7. The closing of the switch 7 effects the connection of the field winding 3 to the source of excitation 10 to pull the motor into synchronism. By closing its contacts 42 the switch 7 completes a locking circuit for the operating winding 9.

In the modification of my invention shown in Fig. 3, the resistor 12 is permanently connected across the field winding 3 and the fast operating switch 13 is arranged to increase the time constant of the field discharge circuit by connecting a low resistance source of excitation 50 of the proper polarity across the terminals of the field winding so that this source of excitation maintains the field flux in the same direction as armature flux therein is at the instant when the source is connected to the field winding. In this modification the cam 29 is designed so as to maintain the switch 13 closed only during the load angle range of 0° to 120°. In order to increase the time constant of the field discharge circuit during the load angle range of 180° to 300°, I provide another fast operating switch 13' having an operating winding 31', the circuit of which is arranged to be completed by another adjustable cam 29' on the shaft 28 during the load angle range of 180° to 300° after the switch 8 closes its contacts 24. The switch 13', when closed, connects a source of excitation 51 to the field winding 3. The source of excitation 51 is of the opposite polarity to that of the source 50.

The operation of the modification shown in Fig. 3 will be obvious from the description given heretofore in connection with the arrangement disclosed in Fig. 1.

With the modification shown in Fig. 3, it will be seen that as soon as the motor speed has been increased by the field circuit time constant varying means to a speed near enough to synchronous speed so that the motor can be pulled into step it will do so immediately, whereas in the arrangement shown in Fig. 1, it cannot do so until after the time relay 33 has operated.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. The method of accelerating a synchronous machine which consists in supplying alternating current to the armature winding and changing the time constant of a field circuit at predetermined points in each slip cycle.

2. The method of accelerating a synchronous machine which consists in supplying alternating current to the armature winding and increasing the time constant of the field circuit each time the flux in the field poles reaches substantially its maximum value in each slip cycle and decreasing the time constant of the field circuit each time the flux in the field poles decreases below a predetermined value in each slip cycle.

3. The method of accelerating a synchronous machine which consists in supplying alternating current to the armature winding and decreasing the time constant of the field circuit at predetermined load angles during each slip cycle and increasing the time constant of the field circuit at other predetermined load angles during each slip cycle.

4. The method of accelerating a synchronous machine which consists in supplying alternating current to the armature winding and maintaining the time constant of the field circuit at a relatively low value during a predetermined load angle range of each half-cycle of slip and at a relatively high value during the remaining load angle range of each half-cycle of slip.

5. The method of accelerating a synchronous machine which consists in supplying alternating current to the armature winding and increasing the time constant of the field circuit at substantially the zero load angle, then decreasing the time constant of the field circuit at a subsequent predetermined load angle of less than 180°, then increasing the time constant of the field circuit at substantially the load angle of 180° and then decreasing the time constant of the field circuit at a subsequent predetermined load angle of less than 360°.

6. The method of accelerating a synchronous machine which consists in supplying alternating current to the armature winding, establishing a field circuit having a relatively short time constant during predetermined portions of each cycle of slip and connecting the field winding to a source of excitation during another portion of each cycle of slip.

7. The method of accelerating a synchronous machine which consists in supplying alternating current to the armature winding completing a field circuit having a relatively short time constant during a predetermined portion of each half-cycle of slip, connecting the field winding to a source of direct current having a predetermined polarity during another portion of a predetermined half-cycle of slip and connecting the field winding to a source of direct current of the opposite polarity during another portion of the other half-cycle of slip.

8. The method of accelerating and synchronizing a synchronous machine which consists in supplying alternating current to the armature winding, changing the time constant of the field circuit at predetermined points in each slip cycle when the machine speed is above a predetermined value, and supplying direct current excitation to the field winding when the machine is operating at a sufficiently high speed to be pulled into synchronism.

9. The method of accelerating and synchronizing a synchronous machine which consists in supplying alternating current to the armature winding, decreasing the time constant of the field circuit at predetermined load angles and increasing the time constant of the field circuit at other predetermined load angles during each slip cycle when the machine speed is above a predetermined value, and supplying direct current excitation to the field winding when the machine is operating at a sufficiently high speed to be pulled into synchronism.

10. The method of accelerating a synchronous machine which consists in supplying alternating current to the armature winding and changing the time constant of a field circuit in cyclic relation to the slip.

11. The method of accelerating a synchronous machine which consists in supplying alternating current to the armature winding and maintaining the time constant of the field circuit at a relatively low value during a portion of each half-cycle of slip and at a relatively high value during another portion of each half-cycle of slip.

12. The method of accelerating a synchronous machine which consists in supplying alternating current to the armature winding, establishing a field circuit having a relatively short time constant and connecting the field winding to a source of excitation in cyclic relation to the slip.

13. In combination, a synchronous machine having an armature winding and a field winding, a circuit for said field winding, means for supplying alternating current to said armature winding, and means for changing the time constant of said field circuit in cylclic relation to the slip of the machine.

14. In combination, a synchronous machine having an armature winding and a field winding, means for supplying alternating current to said armature winding, and means for establishing a circuit for said field winding having a relatively short time constant during a portion of each half-cycle of slip and for establishing a circuit for said field winding having a relatively long time constant during another portion of each half-cycle of slip.

15. In combination, a synchronous machine having an armature winding and a field winding, a circuit for said field winding, means for supplying alternating current to said armature winding, and means for repeatedly changing the time constant of said field circuit at predetermined points in each slip cycle.

16. In combination, a synchronous machine having an armature winding and a field winding, a circuit for said field winding, means for supplying alternating current to said armature winding, and means for increasing the time constant of said field circuit each time the flux in the field poles is a predetermined value during each slip cycle and for subsequently decreasing the time constant thereof during each slip cycle.

17. In combination, a synchronous machine having an armature winding and a field winding, a circuit for said field winding, means for supplying alternating current to said armature winding, and means for decreasing the time constant of said field circuit at predetermined load angles during each slip cycle and increasing the time constant thereof at other predetermined load angles during each slip cycle.

18. In combination, a synchronous machine having an armature winding and a field winding, a circuit for said field winding, means for supplying alternating current to said armature winding, and means for maintaining the time constant of the field circuit at a relatively low value during a predetermined load angle range of each half-cycle of slip and at a relatively high value during the remaining load angle range of each half-cycle of slip when the motor speed is above a predetermined value.

19. In combination, a synchronous machine having an armature winding and a field winding, and means for establishing a field circuit having a relatively short time constant during a portion of each cycle of slip and a relatively long time constant during another portion of each cycle of slip.

20. In combination, a synchronous machine having an armature winding and a field winding, and means for establishing a field circuit having a relatively short time constant during a portion of each cycle of slip and means for supplying direct current excitation to said field winding during another portion of each cycle of slip.

21. In combination, a synchronous machine having an armature winding and a field winding, means for establishing a field circuit having a relatively short time constant during a predetermined portion of each half-cycle of slip, means for supplying direct current excitation of a predetermined polarity to said field winding during another portion of a predetermined half-cycle of slip, and means for supplying direct current excitation of the opposite polarity to said field winding during another portion of the other half-cycle of slip.

22. In combination, a synchronous machine having an armature winding and a field winding and means for establishing a field circuit having a relatively short time constant during a predetermined portion of each cycle of slip and a relatively long time constant during other predetermined portions of each cycle of slip, and means for supplying direct current excitation to said field winding when the machine is operating at a sufficiently high speed to be pulled into synchronism.

23. In combination, a synchronous machine having an armature winding and a field winding and means for establishing a field circuit having a relatively short time constant during a predetermined portion of each cycle of slip and a relatively long time constant during other predetermined portions of each cycle of slip, and means for supplying direct current excitation to said field winding after said time constant varying means has been in operation a predetermined time.

24. In combination, a synchronous machine having an armature winding and a field winding, means for establishing a field circuit having a relatively short time constant during predetermined load angle ranges and a relatively long time constant during other predetermined load angle ranges in each slip cycle when the machine speed is above a predetermined value, and means for supplying direct current excitation to the field winding when the machine is operating at a higher speed.

DAVID R. SHOULTS.